United States Patent [19]

Katner

[11] 3,857,853

[45] Dec. 31, 1974

[54] 3-ALKYL-5-(ALPHA-CYANOBENZYLIDENE) OXAZOLIDINE-2,4-DIONES

[75] Inventor: Allen S. Katner, Indianapolis, Ind.

[73] Assignee: Eli Lilly and Company, Indianapolis, Ind.

[22] Filed: Apr. 23, 1973

[21] Appl. No.: 353,927

[52] U.S. Cl. .............................. 260/307 B, 424/272
[51] Int. Cl. .............................................. C07d 85/34
[58] Field of Search ................................. 260/307 B

[56] References Cited

UNITED STATES PATENTS 3,709,895 1/1973 Kohlhaupt et al. .............. 260/307 B

*Primary Examiner*—Raymond V. Rush
*Attorney, Agent, or Firm*—William E. Maycock; Everet F. Smith

[57] ABSTRACT

3-Alkyl-5-($\alpha$-cyanobenzylidine)oxazolidine-2,4-diones useful as antiviral agents against the MHU3 strain of mouse hepatitis virus. The compounds can be prepared by condensing a substituted ethyl cyanopyruvate with an isocyanate.

7 Claims, No Drawings

3-ALKYL-5-(ALPHA-CYANOBENZYLIDENE) OXAZOLIDINE-2,4-DIONES

BACKGROUND OF THE INVENTION

This invention relates to oxazolidine-2,4-diones. More particularly, this invention relates to 3-alkyl-5-(α-cyanobenzylidene)oxazolidine-2,4-diones useful as anti-viral agents against the MHV3 strain of mouse hepatitis virus.

Because viruses are obligate intracellular parasites that require the active participation of the metabolic processes of the invaded cell, the development of compounds useful as antiviral agents has presented problems more difficult than those encountered in the search for drugs effective against other microorganisms. For example, agents which are effective against viruses frequently injure the invaded cells.

Consequently, the search for antiviral agents has been both long and extensive. However, very few compounds have been found to have clinical applicability. Even these are not free of problems. For example, amantadine is effective against different strains of Asian (A2) influenza, but the compound exhibits substantial neurotoxicity. As a further example, methisazone is useful against the pox group of viruses, but may induce vomiting in the patient. Thus, the search for new antiviral agents continues.

SUMMARY OF THE INVENTION

It therefore is an object of the present invention to provide 3-alkyl-5-(α-cyanobenzylidene)oxazolidine-2,4-diones which are useful as antiviral agents.

It now has been discovered that 3-alkyl-5-(α-cyanobenzylidene)oxazolidine-2,4-diones having the following general formula are effective as antiviral agents:

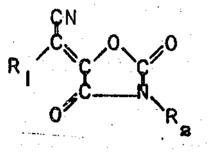

wherein $R_1$ is a monovalent aryl group selected from the group consisting of phenyl, p-chlorophenyl, and p-fluorophenyl and $R_2$ is a monovalent $C_1$-$C_{18}$ alkyl group.

DETAILED DESCRIPTION OF THE INVENTION

The compounds of the present invention can be prepared by condensing a substituted ethyl cyanopyruvate with an aliphatic isocyanate. The suitable substituted ethyl cyanopyruvates consist of ethyl phenylcyanopyruvate, ethyl 4-chlorophenylcyanopyruvate, and ethyl 4-flurophenylcyanopyruvate.

The substituted ethyl cyanopyruvates useful in the preparation of the compounds of the present invention are readily prepared by any of the various means known to those skilled in the art. A particularly useful procedure is found in A. H. Blatt, Editor, "Organic Syntheses," Collective Volume II, John wiley and Sons, Inc., New York, 1943, p. 287, wherein ethyl oxalate and benzyl cyanide are condensed in the presence of sodium ethoxide in ethanol to give ethyl phenylcyanopyruvate.

Examples of suitable aliphatic isocyanates include, among others, methyl isocyanate, ethyl, isocyanate, n-propyl isocyanate, isopropyl isocyanate, n-butyl isocyanate, sec-butyl isocyanate, isobutyl isocyanate; t-butyl isocyanate, n-pentyl isocyanate, isopentyl isocyanate, n-hexyl isocyanate, 2-ethylbutyl isocyanate, 2,2-dimethyl-butyl isocyanate, 2,3-dimethyl-2-butyl isocyanate, n-heptyl isocyanate, 2,3,3-trimethylbutyl isocyanate, n-octyl isocyanate, 2,4,4-trimethylpentyl isocyanate, 2,4-dimethylhexyl isocyanate, 2-ethylhexyl isocyanate, 4-ethyl-3-hexyl isocyanate, n-nonyl isocyanate, 2,6-dimethylheptyl isocyanate, n-decyl isocyanate, n-undecyl isocyanate, n-dodecyl isocyanate, isotetradecyl isocyanate, n-hexadecyl isocyanate, n-octadecyl isocyanate, and the like. Straight-chain aliphatic isocyanates are preferred.

In general, the reaction is carried out in a solvent or solvent mixture having no active hydrogen atoms. Examples of suitable solvents include, among others, aromatic hydrocarbons, such as benzene, toluene, the xylenes, and the like; halogenated hydrocarbons, such as chloroform, ethylene dichloride, perchloroethylene, chlorobenzene, and the like; ketones, such as acetone, methyl ethyl ketone, methyl isobutyl ketone, and the like; ethers such as ethyl ether, methyl isopropyl ether n-butyl ether, α-methoxytoluene, 2-methoxytoluene, 3-methoxytoluene, 4-methoxytoluene, ethoxybenzene, 1,3dioxane, 1,4-dioxane tetrahydrofuran, and the like; and miscellaneous solvents, such as N, N-dimethylformamide, N,N-dimethylacetamide, dimethyl sulfoxide, N-methyl-2-pyrrolidone, and the like. The preferred solvents are ethers, with ethyl ether and tetrahydrofuran being most preferred.

The amount of solvent employed is not critical, but generally is dependent upon the solubility characteristics of the reactants. Usually the reactants will constitute less than about 50 percent by weight of the reaction mixture; preferably, the reactants will constitute less than about 20 percent by weight of the reaction mixture.

The reaction preferably is carried out in the presence of a catalyst which is a tertiary amine; the preferred catalyst is triethylenediamine. The amount of catalyst employed can vary from about 0.001 mole to about 0.01 mole per mole of substituted ethyl cyanopyruvate; preferably, the amount of catalyst employed will be about 0.005 mole per mole of substituted ethyl cyanopyruvate.

In general, the reaction can be carried out at temperatures in the range from about 20°C. to the reflux temperature of the solvent or solvents employed. Obviously the upper temperature limit must be below the decomposition temperature of the least-stable reactant. Preferably, the reaction temperature will be below about 100°C.

The molar ratio of substituted ethyl cyanopyruvate to isocyanate normally will be 1:1, which ratio is preferred. However, this ratio can vary from about 2:1 or higher to about 1:2 or lower.

While the reaction normally will be carried out at atmospheric pressure, sub- or superatmospheric pressures can be employed if desired or necessary, e.g., to lower or raise the boiling point of the solvent employed or to shift the reaction equilibrium.

The compounds of the present invention are useful as antiviral agents, e.g. against the MHV3 strain of mouse hepatitus virus. The compounds may be administered, in accordance with the instant invention, by any convenient parenteral route, i.e., subcutaneously, intravenously, intramuscularly, or intraperitoneally.

The dosage administered will be dependent upon the age, health, and weight of the recipient; kind of concurrent treatment, if any; frequency of treatment; and nature of the effect desired. Generally, a daily dosage of a compound of the present invention will be from about 50 to about 200 milligrams per kilogram of body weight, although lower or higher amounts can be used. Usually, from about 50 to about 150, preferably from about 50 to about 100, milligrams per kilogram per day in one or more applications per day is effective to obtain the desired result.

A compound of the present invention can be employed in a useful composition according to the present invention by incorporating such a compound in a liquid solution or suspension, except that suspensions are not employed for intravenous administrations. In such a composition, a compound of the present invention ordinarily will be present in an amount of at least 0.0001 and not more than 99 percent by weight based on the total weight of the composition.

In addition to a compound of the present invention, the composition will contain a liquid non-toxic pharmaceutical carrier for said compound. The pharmaceutical carrier can be a sterile liquid, such as water and oils, including petroleum, animal, vegetable, and synthetic oils, examples of such oils being peanut oil, soybean oil, mineral oil, cod liver oil, and the like. In general, water, saline, and aqueous dextrose (glucose) and related sugar solutions are the preferred liquid carriers. Such sterile injectable solutions ordinarily will contain from about 0.5 to about 25, and preferably from about 5 to 25, percent by weight of a compound of the present invention.

Suitable pharmaceutical carriers are described in E. W. Martin, et. al., "Remington's Pharmaceutical Sciences," 14th Ed. Mack Publishing Company, Easton, Pa., 1965.

Of course, mixtures of two or more of the compounds of the present invention are contemplated. Also, mixtures of the compounds of the present invention with one or more other pharmaceutically-active materials are considered to be within the scope of the present invention.

The present invention will be more fully described, without intending to limit it in any manner, by the following examples which illustrate certain preferred embodiments. Unless otherwise indicated, all percentages and parts are by weight, and all temperatures are in degrees centigrade.

EXAMPLE 1

Ethyl phenylcyanopyruvate, 6.5 parts, was dissolved in 140 parts of ether, to which solution was added about 0.05 part of triethylenediamine dissolved in several parts of ether. To the resulting solution was added a solution of 4.3 parts of ethyl isocyanate in 70 parts of ether. The reaction solution was allowed to stand for 10 days at ambient temperature. The reaction solution was filtered and the filtrate concentrated to dryness to give 7.6 parts of yellow crystals. The solid was recrystallized three times from ethanol-water to give 3-ethyl-5-(α-cyanobenzilidene-oxazolidene-2,4-dione, m.p. 170°–172°. The following elemental analysis was obtained:

| | |
|---|---|
| Calc. for $C_{13}H_{10}N_2O_3$: | C, 64.46; H, 4.16; N, 11.56 |
| Found: | C, 64.40; H, 4.34; N, 11.54 |

EXAMPLE 2

A solution of 8.7 parts of ethyl phenylcyanopyruvate, 6.8 parts of n-propyl isocyanate, and about 0.05 part of triethylenediamine in 150 parts of ether was allowed to stand at ambient temperature for 10 days. The very dark reaction solution was filtered and the filtrate concentrated to an oil. The oil was triturated with ether and a large quantity of hexane. Filtration of the resulting mixture gave 9.8 parts of solid. A portion of the solid, 6.5 parts, was taken up in 80 parts of ethanol. To the resulting solution was added 5 parts of 2N aqueous sodium hydroxide. The solution was heated gently for about two minutes and cooled. Water was added until crystallization began. Filtration of the crystallized material gave 1.5 parts of 3-n-propyl-5-(α-cyanobenzylidene)oxazolidine-2,4-dione, m.p. 137°–138°. The following elemental analysis was obtained:

| | |
|---|---|
| Calc. for $C_{14}H_{12}N_2O_3$: | C, 65.62; H, 4.72; N, 10.93 |
| Found: | C, 65.64; H, 4.91; N, 10.63 |

EXAMPLE 3

The procedure of Example 1 was repeated, except that the ethyl isocyanate was replaced with 5.9 parts of n-butyl isocyanate. After standing at ambient temperature for three weeks, the reaction solution was filtered and the filtrate concentrated to dryness. The residue was triturated with benzene-hexane. Filtration of the resulting mixture gave 1.9 parts of product, recrystallization of which from benzene-hexane gave n-butyl-5-(cyanobenzylidene)oxazolidine-2,4-dione, m.p. 114°–116°. The following elemental analysis was obtained:

| | |
|---|---|
| Calc. for $C_{15}H_{14}N_2O_3$: | C, 66.66; H, 5.22; N, 10.36 |
| Found: | C, 66.71; H, 5.09; N, 10.31 |

EXAMPLE 4

The procedure of Example 2 was repeated, except that the amount of ethyl phenylcyanopyruvate was increased to 10.9 parts, the n-propyl isocyanate was replaced with 10.2 parts of n-hexyl isocyanate, the total amount of ether was increased to 290 parts, and the reaction time was decreased to six days. The reaction yielded 9.5 parts of crude product. A portion of the product was recrystallized first from ether-hexane, followed by a second recrystallization as described in Example 2, using 68 parts of ethanol. The yield of 3-n-hexyl-5-(α-cyanobenzylidene)-oxazolidine-2,4-dione was 1.6 parts, m.p. 72°–75°. The following elemental analysis was obtained:

| | |
|---|---|
| Calc. for $C_{17}H_{18}N_2O_3$: | C, 68.44; H, 6.08; N, 9.39 |
| Found: | C, 68.38; H, 6.17; N, 9.14 |

EXAMPLE 5

A mixture of 10.9 parts of ethyl phenylcyanopyruvate, 12.4 parts of n-octyl isocyanate, about 0.05 part of triethylenediamine, and 225 parts of tetrahydrofuran was refluxed for 2 hours. The reaction mixture was filtered and the filtrate concentrated to an oil. The oil was admixed with solid carbon dioxide. Ether and hexane then were added to the oil and the resulting mixture was filtered to give 13.2 parts of product. The material was recrystallized as described in Example 2 to give 4.2 parts of 3-n-octyl-5-(α-cyanobenzylidene)oxazolidine-2,4-dione, m.p. 77°–81°. The following elemental analysis was obtained:

| | |
|---|---|
| Calc. for $C_{19}H_{22}N_2O_3$: | C, 69.92; H, 6.79; N, 8.58 |
| Found: | C, 69.64; H, 7.03; N, 8.87 |

EXAMPLE 6

The procedure of Example 5 was repeated, except that the ethyl phenylcyanopyruvate was replaced with 12.6 parts of ethyl 4-chlorophenylcyanopyruvate and the amount of tetrahydrofuran was increased to 315 parts. The reaction mixture was filtered, concentrated and triturated with ether-hexane. Filtration of the resulting mixture gave 14.3 parts of product. The material was successively recrystallized from ether-hexane, ethanol and base as described in Example 2, and aqueous ethanol to give 3-n-octyl-5-(α-cyano-p-chlorobenzylidene)oxazolidine-2,4-dione, m.p. 85°–88°. The following elemental analysis was obtained:

| | |
|---|---|
| Calc. for $C_{19}H_{21}ClN_2O_3$: | C, 63.24; H, 5.87; N, 7.76 |
| Found: | C, 62.98; H, 6.14; N, 7.67 |

EXAMPLE 7

The procedure of Example 2 was repeated, except that the n-propyl isocyanate was replaced with 14.8 parts of n-dodecyl isocyanate and the amount of ether employed was increased to 285 parts. The reaction mixture was filtered, giving 0.25 part of yellow crystals, m.p. 310°. The filtrate was evaporated to an oil which, upon refrigerating overnight, solidified. The solidified oil was dissolved in ether, concentrated, and hexane added; cooling resulted in crystallization. Filtration yielded 13.6 parts of 3-n-dodecyl-5-(α-cyanobenzylidene)oxazolidene-2,4-dione. The material was recrystallized from aqueous ethanol to give 5.0 parts of almost white crystals, m.p. 55°–58°, which gave the following elemental analysis:

| | |
|---|---|
| Calc. for $C_{23}H_{30}N_2O_3$: | C, 72.22; H, 7.91; N, 7.32 |
| Found: | C, 71.98; H, 7.98; N, 7.09 |

EXAMPLE 8

A solution of 2.4 parts of ethyl 4-fluorophenylcyanopyruvate, 4.2 parts of n-dodecyl isocyanate, and about 0.05 part of triethylenediamine in 150 parts of ether was allowed to stand at ambient temperature for 16 days. The reaction solution was filtered and the filtrate concentrated to give 3.1 parts of yellow crystals. The material was recrystallized three times from aqueous ethanol to give 3-n-dodecyl-5-(α-cyano-p-fluorobenzylidene)oxazolidine-2,4-dione, m.p. 68°–70° (Material solidified at about 70° and then remelted at 105°). The following elemental analysis was obtained:

| | |
|---|---|
| Calc. for $C_{23}H_{29}FN_2O_3$: | C, 68.98; H, 7.30; N, 6.99 |
| Found: | C, 69.25; H, 7.51; N, 7.01 |

EXAMPLE 9

The procedure of Example 8 was repeated, except that the ethyl 4-fluorophenylcyanopyruvate was replaced with 7.5 parts of ethyl 4-chlorophenylcyanopyruvate and the n-dodecyl isocyanate was replaced with 17.7 parts of n-octadecyl isocyanate. The solid which formed was isolated by filtration, giving 14.3 parts of 3-n-octadecyl-5-(α-cyano-p-chlorobenzylidene)oxazolidine-2,4-dione. Recrystallization of the product from benzene-hexane gave three crops of crystals. The third crop was recrystallized from methanol to give an analytical sample, m.p. 85°–88°. The nuclear magnetic resonance spectrum was consistent with the assigned structure.

The compounds of Examples 3,4,6,7, and 8 were evaluated as antiviral agents, generally following the procedure of C. E. Redman, et al., 1967, In Vivo Antiviral Chemotherapy, I. Experimental Design and Statistical Evaluation, Antimicrobial Agents and Chemotherapy-1966, pp. 497–502.

Specifically, the MHV3 strain of mouse hepatitis virus was maintained by intraperitoneal passage in weanling SPF Swiss mice. Livers harvested from moribund mice were homogenized as 10% suspensions in Media 199 and centrifuged at 2,000 rpm for 20 minutes. The supernatant liquid, i.e., stock suspension, was transferred to glass ampules which were sealed and stored at −90°.

Frozen stock suspension was used in the evaluation of the compounds of Examples 3,4,6,7, and 8 as antiviral agents, the following procedure being employed: The frozen stock suspension was thawed and diluted 1:1000 with Media 199, the amount of stock suspension employed being sufficient to provide about one $LD_{100}$ per 0.04 ml. of diluted stock suspension. Groups of weanling McAllister Swiss mice were infected by interperitoneal inoculation of each mouse with 0.04 ml. of the diluted stock suspension.

Treatment of the infected mice consisted of interperitoneal injections of 0.25 ml. of material. In the case of the controls, the injected material was saline. In the case of a test compound, the compound was suspended in a 2% by weight solution of a nonionic polyhydroxylated polysaccharide emulsifying agent.

The data obtained were converted, following the procedure of C. E. Redman, et. al., supra, to the survival index (SI), mean day of death (MDD), and ratio of the number of survivors to the number of animals (S/*n*). The denominator of S/*n* also indicates the number of mice employed in that particular group.

The survivial index, SI, is a composite measure of the effectiveness of a compound and incorporates both time of death and number of survivors into a single variable. The SI primarily is used to aid in the interpretation of animal tests employing lethal infections. The SI results from a linear transformation of the proportion of deaths and the day of death.

EXAMPLE 10

The evaluation of the compounds of Examples 3,4,6,7, and 8 as antiviral agents gave the following results against the MHV3 strain of mouse hepatitis virus (except for the controls, all test mice received injections at a dose level of 50 mg/kg):

| Compound Example[a] | SI | MDD | S/n |
|---|---|---|---|
| 3 | 2.32 | 5.0 | 3/10[c] |
| 4 | 2.57 | 4.7 | 4/10[c] |
| 6 | 2.80[b] | 6.0 | 2/8 |
| 7 | 3.27[b] | 6.3 | 4/10[c] |
| 8 | 3.15[b] | 6.4 | 3/10[c] |
| Controls | 2.16 | 5.3 | 3/30 |

[a]Each compound was administered intraperitoneally, in a dosage equivalent to the indicated dose, at 5 and 24 hour post-infection, for a total of two administrations of the compound to each mouse in the test group; control mice received an equal volume of saline in place of the test compound.
[b]SI statistically significant, at the 95% level, compared with control.
[c]A three-fold increase in the number of survivors is considered indicative of activity.

It should be noted that either SI or S/*n* alone can be indicative of activity, although SI is the preferred indicator for the reasons presented in C. E. Redman, et al., supra. Also, it should be noted that SI still is indicative of activity when below a value which is statistically significant at the 95% confidence level.

From Example 10 it is seen that the compounds of the present invention are effective against MHV3 mouse hepatitis virus.

What is claimed is:

1. A compound of the formula:

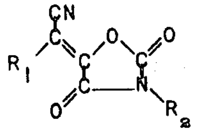

wherein $R_1$ is a monovalent aryl group selected from the group consisting of phenyl, p-chlorophenyl, and p-fluorophenyl and $R_2$ is monovalent $C_1$–$C_{18}$ alkyl.

2. The compound of claim 1, wherein $R_2$ is monovalent $C_1$–$C_{18}$ straight-chain alkyl.

3. The compound of claim 2, wherein $R_1$ is phenyl and $R_2$ is n-butyl.

4. The compound of claim 2, wherein $R_1$ is phenyl and $R_2$ is n-hexyl.

5. The compound of claim 2, wherein $R_1$ is 4-chlorophenyl and $R_2$ is n-octyl.

6. The compound of claim 2, wherein $R_1$ is phenyl and $R_2$ is n-dodecyl.

7. The compound of claim 2, wherein $R_1$ is 4-fluorophenyl and $R_2$ is n-dodecyl.

* * * * *